(12) United States Patent
Hou et al.

(10) Patent No.: US 7,417,103 B2
(45) Date of Patent: Aug. 26, 2008

(54) ISOTACTIC 3,4-ISOPRENE-BASED POLYMER

(75) Inventors: Zhaomin Hou, Wako (JP); Lixin Zhang, Wako (JP)

(73) Assignee: Riken, Saitama (JP)

( * ) Notice: Subject to any disclaimer, the term of this patent is extended or adjusted under 35 U.S.C. 154(b) by 30 days.

(21) Appl. No.: 10/591,322

(22) PCT Filed: Mar. 4, 2005

(86) PCT No.: PCT/JP2005/003782

§ 371 (c)(1),
(2), (4) Date: Aug. 31, 2006

(87) PCT Pub. No.: WO2005/085306

PCT Pub. Date: Sep. 15, 2005

(65) Prior Publication Data

US 2007/0179260 A1    Aug. 2, 2007

(30) Foreign Application Priority Data

Mar. 4, 2004 (JP) .............................. 2004-060538

(51) Int. Cl.
*C08F 4/52* (2006.01)
*C08F 136/04* (2006.01)
*C08F 136/08* (2006.01)

(52) U.S. Cl. .................... 526/340.2; 526/131; 526/134; 526/170; 526/335

(58) Field of Classification Search .................. 526/335, 526/340.2, 131, 134, 170
See application file for complete search history.

(56) References Cited

U.S. PATENT DOCUMENTS

| 5,064,802 A | 11/1991 | Stevens et al. |
| 2003/0018144 A1 | 1/2003 | Kaita et al. |

FOREIGN PATENT DOCUMENTS

| EP | 0 191 355 A1 | 8/1986 |
| JP | 35-13242 B1 | 4/1960 |
| JP | 49-44092 A | 4/1974 |
| JP | 61-07602 A | 9/1986 |
| JP | 3-139504 A | 6/1991 |
| JP | 2000-313710 A | 11/2000 |

OTHER PUBLICATIONS

Natta et al., Die Makromolekulare Chemie, vol. 77, pp. 126-138, 1964.
Nakayama et al., Macromolecules, vol. 36, No. 21, pp. 7953-7958, 2003.

*Primary Examiner*—Caixia Lu
(74) *Attorney, Agent, or Firm*—Birch, Stewart, Kolasch & Birch LLP

(57) ABSTRACT

The present invention provides 3,4-isoprene-based polymer with high regioregularity, in particular high tacticity.

Specifically, the present invention provides an isoprene-based polymer, including a structural unit represented by Formula (I) in Claims, wherein the isotacticity of an arrangement of the structural units is 99% mmmm or more in terms of pentad content. Further, the present invention provides a production method for the isoprene-based polymer, which comprises polymerizing an isoprene-based compound in the presence of a polymerization catalyst containing a complex represented by the following Formula (A) in Claims.

8 Claims, 4 Drawing Sheets

$^1$H-NMR spectrum of isotactic 3,4-polyisoprene

ISOTACTIC 3,4-ISOPRENE-BASED POLYMER

TECHNICAL FIELD

The present invention relates to an isoprene-based polymer, and more particularly to an isoprene-based polymer, preferably isoprene polymer, which is highly regioselected and is having high tacticity.

BACKGROUND ART

An isoprene polymer may have any one or two or more of the following four different structural units. That is, these structural units are: a 3,4-bond structural unit represented by Formula (I'); a trans 1,4-bond structural unit represented by Formula (II') below; a cis 1,4-bond structural unit represented by Formula (III'); and a 1,2-bond structural unit represented by Formula (IV')

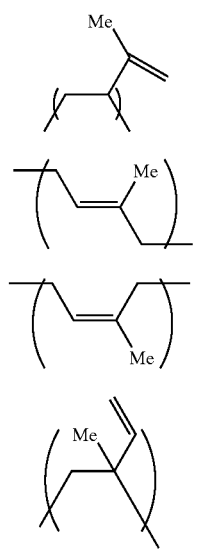

The following two reports have been made on productions of isoprene polymers that selectively have, among the above-mentioned structural units, the structural units represented by Formula (I'). One is a report on production of the above-mentioned polymer by polymerizing isoprene using an aluminum alkyl-titanium alkoxide $(AlEt_3\text{-}Ti(OC_3H_7\text{-}n)_4)$—based catalyst as a polymerization catalyst (see Non-Patent Document 1). The other is a report on production of the above-mentioned polymer by polymerizing isoprene using a complex in which sparteine is coordinated to $FeCl_2$ as a polymerization catalyst (see Non-Patent Document 2).

Meanwhile, the above-mentioned isoprene polymer that selectively has the structural units represented by Formula (I') is considered to have significantly different properties depending on the tacticity of an arrangement of the structural units. Like an isoprene polymer including the structural units represented by Formula (I'), a polymer in which an atom of a main chain has two different side chain substituents, may have two kinds of stereoisomer. The "tacticity" means a manner or order of arrangement of such moieties involved in stereoisomerism in a main chain of a polymer. A polymer, in which one type of substituents of different two types of side chain substituents are bound only to one side with respect to the plane formed by the main chain of the polymer, is referred to as an isotactic polymer (represented by Formula (V) below), while a polymer, in which one type of substituents are alternately bound to the both sides with respect to the plane, is referred to as a syndiotactic polymer (represented by Formula (VI) below). Meanwhile, a polymer not having such regularity is referred to as an atactic polymer.

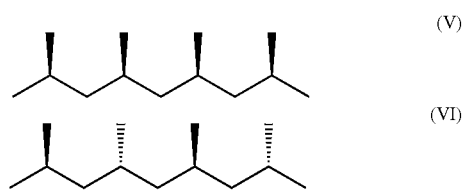

The above-mentioned Non-Patent Document 1 describes that the resultant isoprene polymer is an atactic polymer, while Non-Patent Document 2 does not describe the tacticity of the resultant isoprene polymer. Therefore, an isoprene polymer that selectively has Formula (I') described above and has high tacticity has been required.

Non-Patent Document 1: Makromolekulare Chem. (1964), 77, pp. 126-138.
Non-Patent Document 2: Macromolecules (2003), 36, pp. 7953-7958.

DISCLOSURE OF THE INVENTION

Problems to be Solved by the Invention

The present invention has been made under such circumstances, and an object of the present invention is to provide a novel polymer, i.e., an isoprene-based polymer that selectively has the structural units represented by Formula (I) to be described below and has high tacticity of an arrangement of the structural units (in particular, isotactic-rich isoprene-based polymer). In addition, another object of the present invention is to provide a method of producing the polymer.

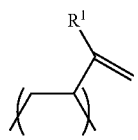

(In Formula (I), $R^1$, represents an alkyl group having 1 to 10 carbon atoms or an alkenyl group having 3 to 10 carbon atoms.)

Means for Solving the Problems

That is, the present invention is as follows.
(1) An isoprene-based polymer including a structural unit represented by Formula (I):

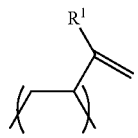

wherein $R^1$ represents an alkyl group having 1 to 10 carbon atoms or an alkenyl group having 3 to 10 carbon atoms, wherein the isotacticity of an arrangement of the structural units is 60% mm or more in terms of triad content.

(2) The polymer according to (1), wherein $R^1$ in Formula (I) is a methyl group.

(3) The polymer according to (1) or (2), wherein the isotacticity is 99% mmmm or more in terms of pentad content.

(4) The isoprene-based polymer according to any one of (1) to (3), wherein the rate of the structural units represented by Formula (I) in a microstructure is 95% or more.

(5) The polymer according to any one of (1) to (4), wherein the polymer has a number average molecular weight of 5,000 to 6,000,000.

(6) A production method for the isoprene-based polymer according to any one of (1) to (5), which comprises;

polymerizing an isoprene-based compound represented by the following Formula (X):

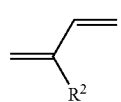

(X)

wherein $R^2$ represents an alkyl group having 1 to 10 carbon atoms or an alkenyl group having 3 to 10 carbon atoms, in the presence of a polymerization catalyst containing a complex represented by the following Formula (A):

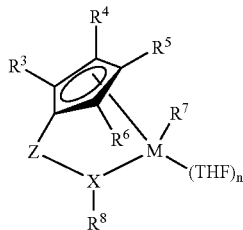

(A)

wherein M represents a rare-earth metal atom, each of $R^3$ to $R^6$ independently represents a hydrogen atom or an alkyl group, $R^7$ represents an alkyl group, $R^8$ represents an aryl or alkyl group, THF represents a tetrahydrofuran ligand, n denotes an integer of 0 to 2, X represents N, P, or As, and Z represents a dialkylsilylene, dialkyl germanium cross-linking, or ethylene group.

(7) The production method according to (6), wherein $R^2$ in Formula (X) is a methyl group.

(8) The production method according to (6) or (7), wherein the polymerization is solution polymerization, and the polymerization reaction temperature is 0° C. or lower.

BEST MODE FOR CARRYING OUT THE INVENTION

Figure 1:
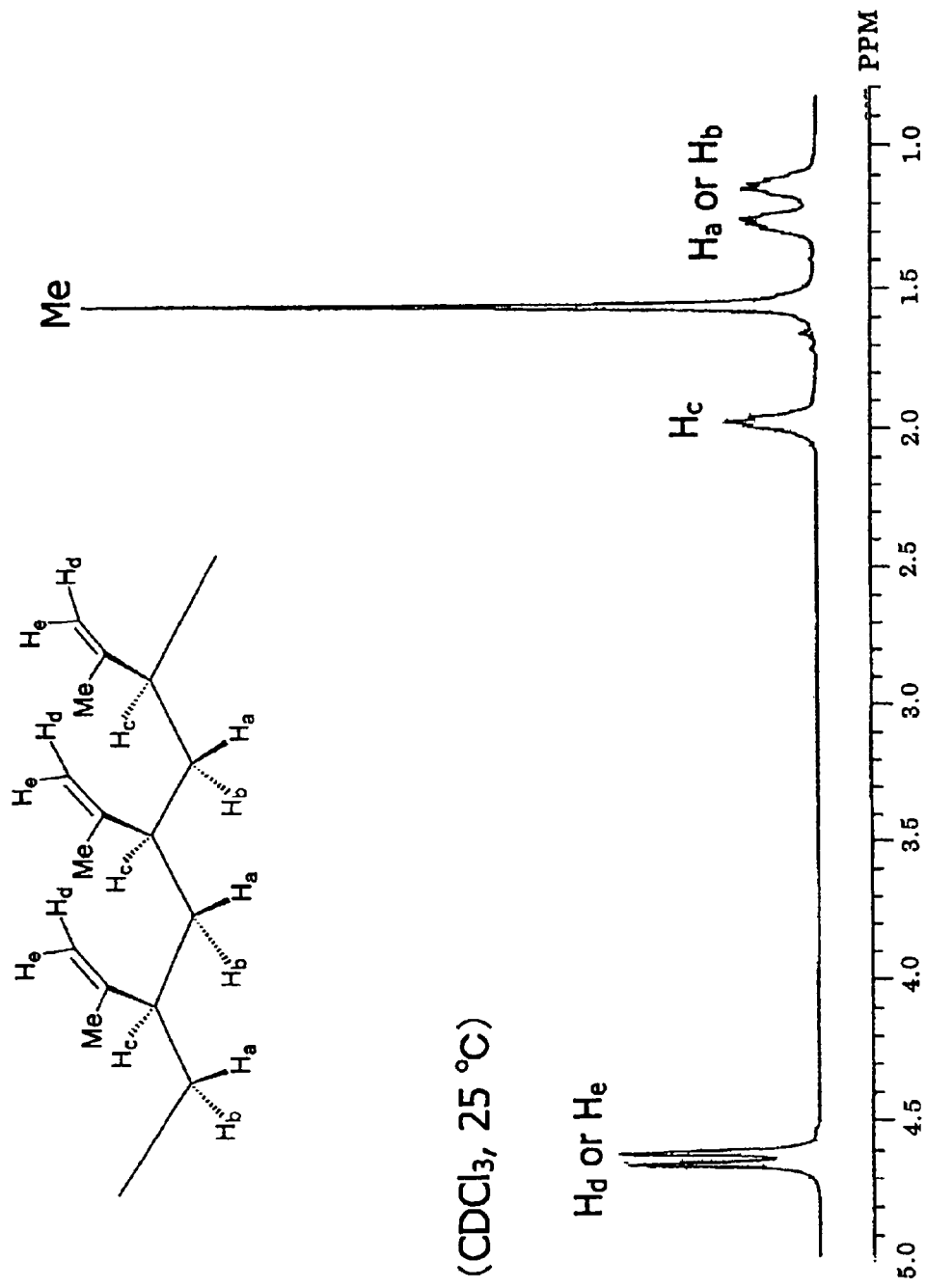
[FIG. 1] A measurement chart of a $^1$H-NMR spectrum of the polymer obtained in Example 1.

The isoprene-based polymer of the present invention may include the following structural units represented by Formula (I), (II), (III), and (IV) (hereinafter, each of them is also simply referred to as "structural unit (I), (II), (III), or (IV)") at any proportion. In the structural units (I) to (IV), $R^1$ is an alkyl or alkenyl group. For example, $R^1$ is an alkyl group having 1 to 10 carbon atoms (preferably C1-C6) or an alkenyl group having 1 to 10 carbon atoms (preferably C1-C6), and most preferably, $R^1$ is a methyl group. That is, the most preferable polymer is an isoprene polymer. In addition, preferable example of $R^1$ is a 4-methyl-3-pentenyl group, that is, example of a preferable polymer is a myrcene polymer.

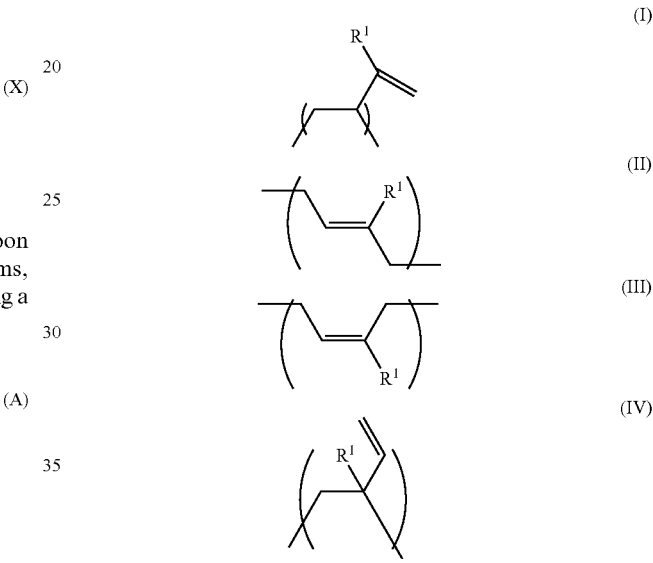

The rate of the structural units (I) included in the isoprene-based polymer of the present invention in a microstructure of the polymer is generally 60% or more, preferably 90% or more, more preferably 95% or more, and further preferably 99% or more. Note that, the isoprene-based polymer of the present invention may include the structural units (II) to (IV) at any proportion in addition to the structural units (I). The rate of the structural units (I) in the microstructure may be calculated by measuring an NMR spectrum of the resultant isoprene-based polymer, determining integrated values of peaks attributed to the respective structural units, and comparing the values. The calculation will be described later in the specification of the present application.

In general, the structural units (I) included in the isoprene-based polymer of the present invention are arranged via head-to-tail bonds, and the polymer may have the following two stereoisomers due to the arrangement. That is, the polymer may have the two stereoisomers based on the bond direction of a 1-alkylvinyl or 1-alkenylvinyl group (—C($R^1$)=CH$_2$), or a hydrogen atom to a plane formed by the main chain of the polymer. The structural units (I) included in the isoprene-based polymer of the present invention are arranged with stereoregularity, preferably with high isotacticity. The phrase "arranged with high isotacticity" means a state where the 1-alkylvinyl or 1-alkenylvinyl group (or a hydrogen atom) in Formula (I) is selectively arranged on one side to a plane formed by the main chain of the polymer.

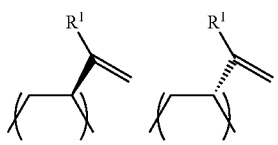

To be specific, the isotacticity of an arrangement of the structural units (I) included in the isoprene-based polymer of the present invention is at least 60% mm or more, generally 80% mm or more, preferably 90% mm or more, more preferably 95% mm or more, and further preferably 99% mm or more in terms of triad content, and most preferably 99% mmmm or more in terms of pentad content.

Herein, the triad content will be briefly described. The triad of the structural units (I) in an isoprene-based polymer may include the following three types: isotactic triad; heterotactic triad; and syndiotactic triad. The isotacticity in terms of triad content means a rate of "the isotactic triad" to "the sum of isotactic triad, heterotactic triad, and syndiotactic triad" in a' polymer, and the percentage of the rate is represented as "% mm".

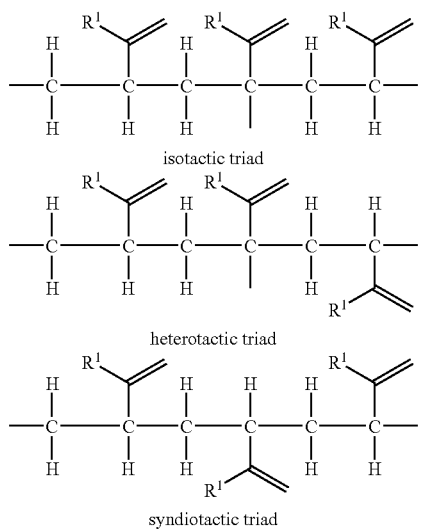

isotactic triad heterotactic triad syndiotactic triad

Meanwhile, the isotacticity in terms of pentad content means, as in the case of the triad content, a rate of the isotactic pentads to pentads of the structural units (I), and the percentage of the rate is represented as "% mmmm".

The isotacticity of an arrangement of the structural units (I) included in the isoprene-based polymer of the present invention may be represented by the triad content or pentad content as described above. Note that, the isotacticity of the isoprene-based polymer of the present invention in terms of triad or pentad content may be calculated from NMR (preferably $^{13}$C-NMR) spectrum data of the resultant isoprene-based polymer. The calculation will be described later in the specification of the present application.

The average molecular weight of the isoprene-based polymer of the present invention is any value, but the number average molecular weight of the polymer is at least 5,000 or more, generally 50,000 or more, preferably 200,000 or more, and more preferably 300,000 or more. Note that, the upper limit of the number average molecular weight is not particularly limited but may be about 6,000,000 or less. The number average molecular weight means a number average molecular weight measured by GPC, and the measurement may be performed using, for example, a GPC measuring device (TOSOH HLC 8220 GPC).

The molecular distribution (Mw/Mn) of the isoprene-based polymer of the present invention is generally 6 or less, preferably 3 or less, and more preferably 1.7 or less. The molecular distribution means a molecular distribution measured by GPC, and the measurement may be performed using, for example, a GPC measuring device (TOSOH HLC 8220 GPC).

The isoprene-based polymer of the present invention has a 1-alkylvinyl or 1-alkenylvinyl group containing a carbon-carbon double bond as a side chain. The carbon-carbon double bond in the vinyl group may be hydrosilylated or hydroborated.

The isoprene-based polymer of the present invention may include not only a homopolymer but also a copolymer. Such a copolymer may be, for example, a copolymer of isoprene and an isoprene-based compound other than isoprene, or a copolymer of isoprene and a conjugated diene. In addition, it may be a copolymer of an isoprene-based compound and a polar monomer (including lactone, acrylic ester, etc.).

Method of Producing Isoprene-based Polymer of the Present Invention

The isoprene-based polymer of the present invention may be produced by polymerizing an isoprene-based compound represented by Formula (X) to be described below. In Formula (X), $R^2$ may be any group, preferably an alkyl or alkenyl group. For example, $R^2$ is an alkyl group having 1 to 10 carbon atoms (more preferably C1-C6) or an alkenyl group having 3 to 10 carbon atoms (more preferably C1-C6), and most preferably, $R^2$ is a methyl group. That is, the most preferable compound is isoprene. In addition, preferable example of $R^2$ is a 4-methyl-3-pentenyl group, that is, myrcene is also a preferable isoprene-based compound.

(X)

A polymerization method of an isoprene-based compound in the production method of the present invention may be addition polymerization, polycondensation, polyaddition, or another method, and addition polymerization using a polymerization catalyst is preferable. The polymerization catalyst is preferably a catalyst including a metallocene complex. The catalyst preferably further includes an ionic compound composed of non-coordinated anion and cation, and the catalyst may selectively further include an additional ingredient.

The above-mentioned metallocene complex is preferably a rare-earth metallocene complex including a rare-earth metal atom as a central metal. Herein, the rare-earth metal atom-means scandium (Sc), yttrium (Y), or any of 15 lanthanoids. The "metallocene complex" refers to a compound in which a cyclopentadienyl, indenyl, or fluorenyl ring that may be substituted is coordinated to a central metal element.

To be more specific, the above-mentioned metallocene complex is preferably a complex represented by Formula (A) to be described below.

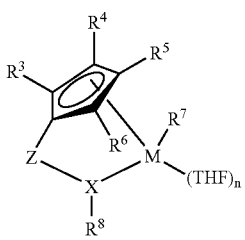

(A)

(In Formula (A), M represents a rare-earth metal atom, each of $R^3$ to $R^6$ independently represents a hydrogen atom or an alkyl group, $R^7$ represents an alkyl group, $R^8$ represents an aryl or alkyl group, THF represents a tetrahydrofuran ligand, n denotes an integer of 0 to 2, X represents N, P, or As, and Z represents a dialkylsilylene, dialkyl germanium cross-linking, or ethylene group.)

In the above-mentioned Formula (A), M is any rare-earth metal atom, preferably scandium (Sc), yttrium (Y), or any of lanthanoids (except for promethium (Pm) and europium (Eu)), more preferably yttrium or lutetium, and most preferably yttrium.

In Formula (A), each of $R^3$ to $R^6$ is a hydrogen atom or an alkyl group, in which the respective substituents may be the same or different. The alkyl group includes a linear or branched group having, for example, about 1 to 6 carbon atoms, and is preferably about 1 to 4 carbon atoms, and more preferably a methyl group. $R^3$ to $R^6$ may be the same or different. All of them are preferably the same, and more preferably methyl groups.

In Formula (A), $R^7$ represents an alkyl group. Examples thereof include a methyl group, an ethyl group, a propyl group, a butyl group, and a trialkylsilylmethyl group. $R^7$ preferably represents a mono(trialkylsilyl)methyl group or a di(trialkylsilyl)methyl group. Three alkyl groups bonded to the silyl element are same as the alkyl groups represented by any one of $R^3$ to $R^6$ described above. Examples of the trialkylsilyl include trimethylsilyl and t-butyldimethylsilyl.

In Formula (A), Z represents a dialkylsilylene group, a dialkylgermanium cross-linking group (—Ge(alkyl)$_2$-), or an ethylene group. An example of dialkyl in the dialkylsilylene group or the dialkylgermanium cross-linking group is preferably a lower dialkyl such as dimethyl and the like.

In Formula (A), X represents a nitrogen (N), phosphorus (P), or arsenic (As) atom. X is preferably a phosphorus atom. $R^8$ that is a substituent on X represents an aryl or alkyl group that may have a substituent. The aryl group is preferably a phenyl group. The number, type, and substitution site of a substituent on the aryl group are not particularly limited, but the type of the substituent is preferably an alkyl group, and the number thereof is preferably about 1 to 3. The aryl group is preferably an unsubstituted phenyl group or a phenyl group having about 1 to 3 alkyl groups.

Meanwhile, the alkyl group represented as $R^8$ includes a linear, branched, or cyclic alkyl group having about 1 to 12 carbon atoms. A cyclic alkyl group having about 5 to 7 carbon atoms in the ring, for example, a cyclohexyl group is preferable.

In Formula (A), n (i.e., the number of THF ligand(s)) may be 0 to 2, but n is appropriately selected depending on the types of the central metal (M) and $R^6$. For example, in the case where $R^8$ is a cyclohexyl group, n is 0 in some cases. In addition, in the case where $R^8$ is a phenyl group, n is 1 or 2 in some cases.

A complex represented by Formula (A) described above may be present as a mononuclear complex or as a binuclear complex, that is, the binuclear complex may have a structure represented by Formula (B) to be described below. That is, the complex (A) to be used in the polymerization method of the isoprene-based polymer of the present invention includes a complex that is present as a binuclear complex represented by Formula (B). A polynuclear complex including a binuclear complex may have properties different from a mononuclear complex. For example, one central metal may act as a coordination site, while the other central metal may act as an activation site, so that the complex may realize a specific reaction, which is not achieved in the case of a mononuclear complex.

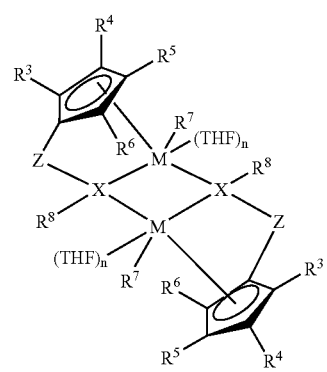

(B)

(In Formula (B), each of $R^3$ to $R^8$, M, X, Z, and n has the same meaning as that in Formula (A).)

A complex represented by Formula (A) may be produced in accordance with the following schemes, for example. The following shows a production example of a complex represented by Formula (A) in which all of $R^3$ to $R^6$ are methyl groups, $R^7$ is a trimethylsilylmethyl group, Z is a dimethylsilylene group, and M and $R^8$ have the same meanings as the above. A person skilled in the art can easily produce the complex represented by Formula (A) by appropriately selecting starting raw materials, reaction reagents, reaction conditions, etc. with reference to the general synthetic schemes to be shown below, and if necessary, additionally modifying or altering these methods. Note that, the complex represented by Formula (A) may also be synthesized with reference to the descriptions of Tetrahedron, 59, 10525 (2003) or JP 2003-190806 A.

(a)

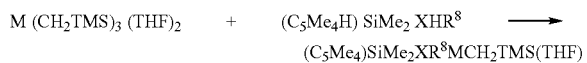

(b)

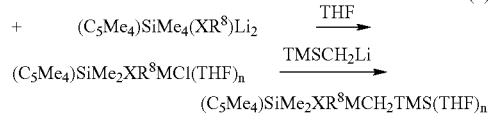

As described above, the polymerization catalyst to be used in the production method of the isoprene-based polymer of the present invention preferably includes an ionic compound composed of non-coordinated anion and cation. The ionic compound is considered to have an ability to react with the complex (A) to generate a cationic complex.

An example of an uncoordinated anion of an ionic compound in the catalyst preferably includes a tetravalent boron anion. Examples of a compound of the tetravalent boron anion include tetra(phenyl)borate, tetrakis(monofluorophenyl)borate, tetrakis(difluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl),phenyl]borate, and tridecahydride-7,8-dicarbaundecaborate.

Examples of a cation of an ionic compound in the catalyst can include a carbonium cation, an oxoniumcation, an ammonium cation, a phosphonium cation, a cycloheptatrienyl cation, and a ferrocenium cation having a transition metal. A specific example of the carbonium cation can be a trisubstituted carbonium cation such as a triphenylcarbonium cation or a tri(substituted phenyl)carbonium cation. Specific examples of the tri(substituted phenyl)carbonium cation can be a tri(methylphenyl)carbonium cation and a tri(dimethylphenyl)carbonium cation. Specific examples of the ammonium cation can be: a trialkylammonium cation such as trimethylammonium cation, a triethylammonium cation, a tripropylammounium cation, a tributylammonium cation, or tri(n-butyl)ammonium cation; an N,N-dialkylanilinium cation such as an N,N-diethylanilinium cation or an N,N-2,4,6-pentamethylanilinium cation; and a dialkylammonium cation such as di(isopropyl)ammonium cation and dicyclohexylammonium cation. A specific example of the phosphonium cation can be a triarylphosphonium cation such as a triphenylphosphonium cation, a tri(methylphenyl)phosphonium cation, or a tri(dimethylphenyl)phosphonium cation.

That is, compounds each selected from the uncoordinated anions and the cations are combined and can be used as the ionic compound. Examples thereof are preferably triphenylcarbenium tetrakis(pentafluorophenyl)borate, triphenylcarbenium tetrakis(tetrafluorophenyl)borate, N,N-dimethylanilinium tetrakis(pentafluorophenyl)borate, and 1,1'-dimethylferrocenium tetrakis(pentafluorophenyl)borate. One ionic compound may be used alone, or two or more of them may be used in combination. In addition, $B(C_6F_5)_3$, $Al(C_6F_5)_3$, and the like can be used as Lewis acid that can produce cationic transition metal compounds through a reaction with a transition metal compound. Any one of them may be used in combination with the ionic compound.

The polymerization catalyst to be used in the production method of the isoprene-based polymer of the present invention may further include a third component such as an organic aluminum-based compound or aluminoxane. Addition of the organic aluminum-based compound or aluminoxane may promote removal of impurities in a reaction system or chain transfer, so that the activity of the catalyst, molecular weight of the resultant polymer, or the like is expected to change.

In production of the polymer of the present invention, the above-mentioned rare-earth metallocene complex may be used in any amount. The complex is preferably used in an amount of 1/300 to 1/1,200 molar equivalent to a monomer (i.e., an isoprene-based compound). Decrease in the amount of the complex to isoprene may increase the molecular weight of the resultant isoprene-based polymer, while increase in the amount of the complex may decrease the molecular weight of the isoprene-based polymer.

The amount of an ionic compound included in the polymerization catalyst to be used in production of the isoprene-based polymer of the present invention is preferably 1 molar equivalent or less with respect to a metallocene complex (B) of a binuclear complex.

As described above, the ionic compound is considered to react with the metallocene complex (B) to generate a cationic complex, but the complex (B) is a binuclear complex, so that if 1 molar equivalent of an ionic compound is allowed to react with the complex (B), a cation may be generated on one central metal in the binuclear complex. Meanwhile, the alkyl group on the other central metal of the binuclear complex may act as an activation site (i.e., may be inserted in a monomer). Therefore, the production method of the present invention is characterized in that a co-catalyst (e.g., an organic aluminum-based compound or aluminoxane) generally required in a polymerization reaction using a metallocene complex is not necessarily required.

The polymerization method to be used in production of the polymer of the present invention may be any method such as gas phase polymerization, solution polymerization, or slurry polymerization. In the case of the solution polymerization, a solvent to be used is not particularly limited as long as the solvent is inactive in a polymerization reaction and has an ability to dissolve an isoprene-based compound and a catalyst. Examples thereof include: saturated aliphatic hydrocarbons such as butane, pentane, hexane, and heptane; saturated alicyclic hydrocarbons such as cyclopentane and cyclohexane; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene, and chlorotoluene; and ethers such as tetrahydrofuran and diethyl ether. Among those solvents, a solvent having a melting point lower than 0° C. is preferable, and a solvent having a melting point lower than −20° C. is more preferable. In addition, a solvent having no toxicity to a living body is preferable. To be specific, an aromatic hydrocarbon is preferable, and chlorobenzene is particularly preferable. As a solvent, one solvent may be used, or a mixed solvent including two or more of them may be used.

Meanwhile, the amount of a solvent to be used is preferably an amount to adjust the concentration of a complex included in a polymerization catalyst to 0.001 to 0.005 M.

The polymerization temperature in the case where the polymerization of the present invention is performed by the solution polymerization is any temperature, for example, in the range of −100 to 100° C. The temperature is generally 25° C. or lower, preferably 0° C. or lower, more preferably −10° C. or lower, and further preferably −20° C. or lower. Decrease in the polymerization temperature may enhance the tacticity (isotacticity) of an arrangement of the structural units (I) included in the resultant isoprene-based polymer. That is, adjustment of the polymerization temperature may adjust the isotacticity.

The polymerization time is, for example, about 10 minutes to 100 hours, generally 1 hour or more, and about 2 to 5 hours. Note that, those reaction conditions may be appropriately selected depending on the polymerization reaction temperature, the type and molar quantity of a monomer, the type and amount of a catalyst composition, and the like, and the values are not limited to the above-exemplified range. As described above, the polymerization in the present invention is preferably performed at a lower temperature, so that, in the case where the lowering of the temperature causes decrease in the reactivity, it is preferable to extend the polymerization time.

The polymerization reaction may be performed by adding a complex (A), an isoprene compound (X), and preferably an ionic compound, and another compound in a reaction system in any order, and in general, the reaction is performed by adding an ionic compound to a mixture of a complex (A) and an isoprene-based compound (X). Meanwhile, if the polymerization reaction is performed by adding an isoprene-based compound (X) to a mixture of a complex (A) and an ionic compound, a molecular weight distribution curve of the resultant isoprene-based polymer may have aplurality of peaks (i.e., a mixture of isoprene-based polymers having different molecular weight distribution peaks may be yielded).

After attaining a predetermined polymerization rate by the polymerization reaction, a known polymerization terminator (e.g., methanol containing BHT (2,6-bis(t-butyl)-4-methylphenol)) may be added to the polymerization system to terminate the reaction, and then the resultant polymer may be separated from the reaction system in accordance with a general method.

The isoprene-based polymer of the present invention may be identified by $^1$H-NMR analysis, $^{13}$C-NMR analysis, measurements of an average molecular weight and a molecular weight distribution by GPC, IR measurement, mass analysis, or the like. Note that, in the description of the present application, the "NMR analysis" means an analysis by nuclear magnetic resonance spectroscopy at a frequency of 400 MHz. The analysis may be performed by using JNM-AL-400RN manufactured by JEOL Ltd., which is an NMR analysis instrument, for example. Meanwhile, "NMR spectrum data" means spectrum data obtained through the analysis. Note that, the measurement is performed by using $CDCl_3$ as a solvent at a temperature of 25° C.

The rate of the structural units (3,4-structures) represented by Formula (I) in a microstructure of the isoprene-based polymer of the present invention may be determined by NMR spectrum data based on the descriptions of the following known documents (W. M. Dong, T. Masuda, J. Polym. Sci., Part A: Polym. Chem., 40, 1838 (2002); A. S. Khatchaturov, E. R. Dolinskaya, L. K. Prozenko, E. L. Abramenko, and V. A. Kormer, Polymer, 18, 871, (1976)).

Figure 2:
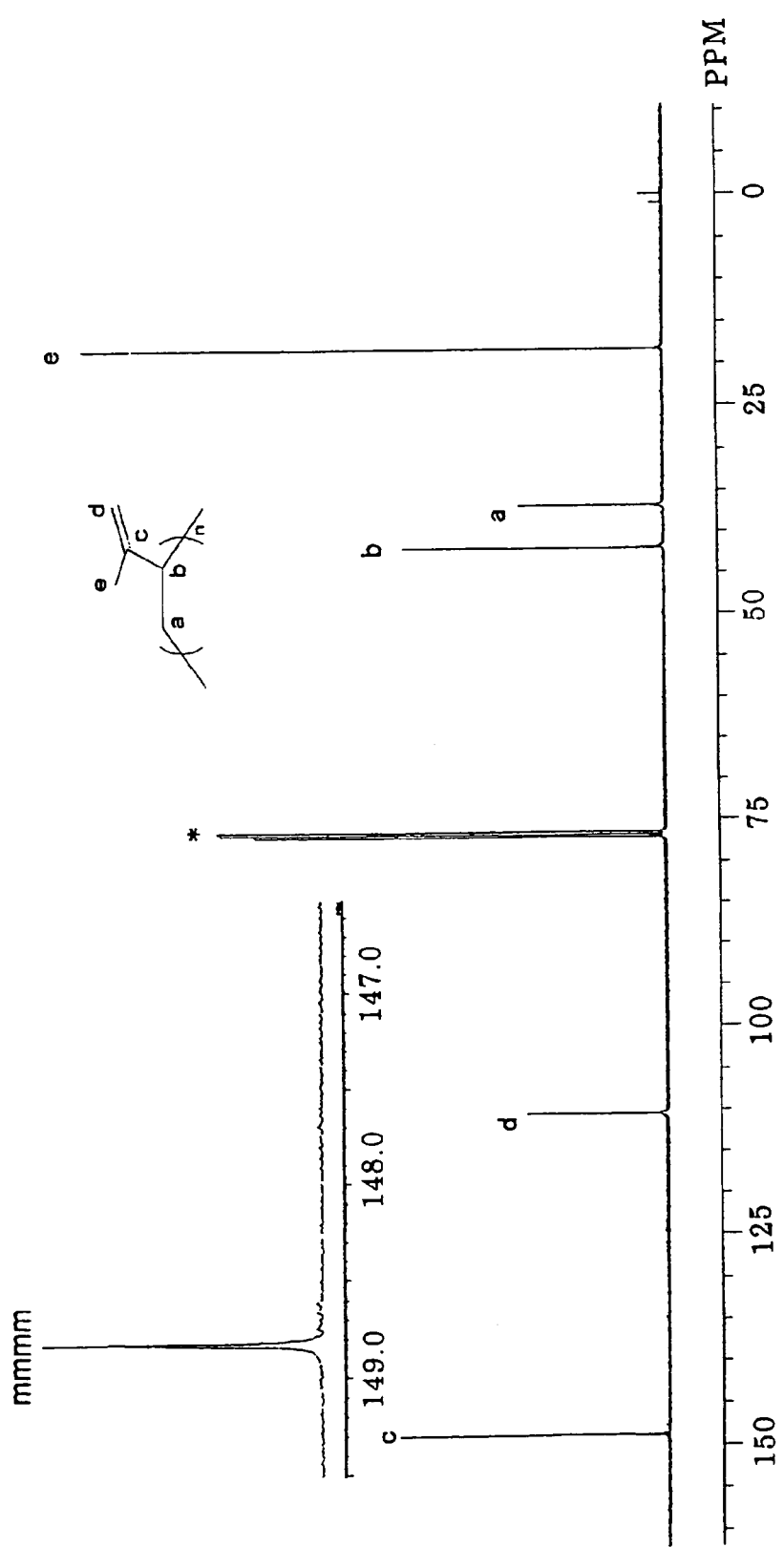
[FIG. 2] A measurement chart of a $^{13}$C-NMR spectrum of the polymer obtained in Example 1.
Figure 3:
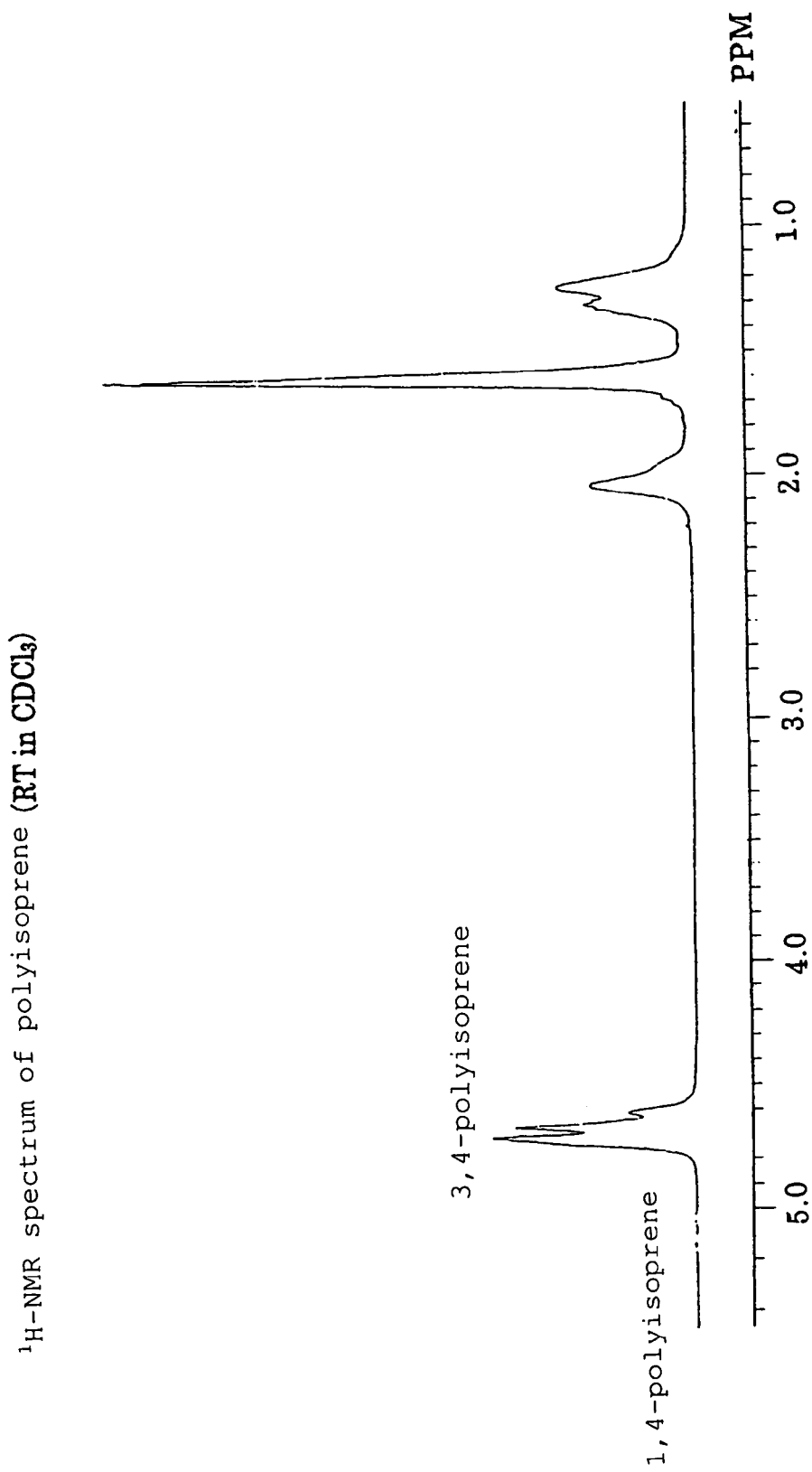
[FIG. 3] A measurement chart of a $^1$H-NMR spectrum of the polymer obtained in Example 4.
Figure 4:
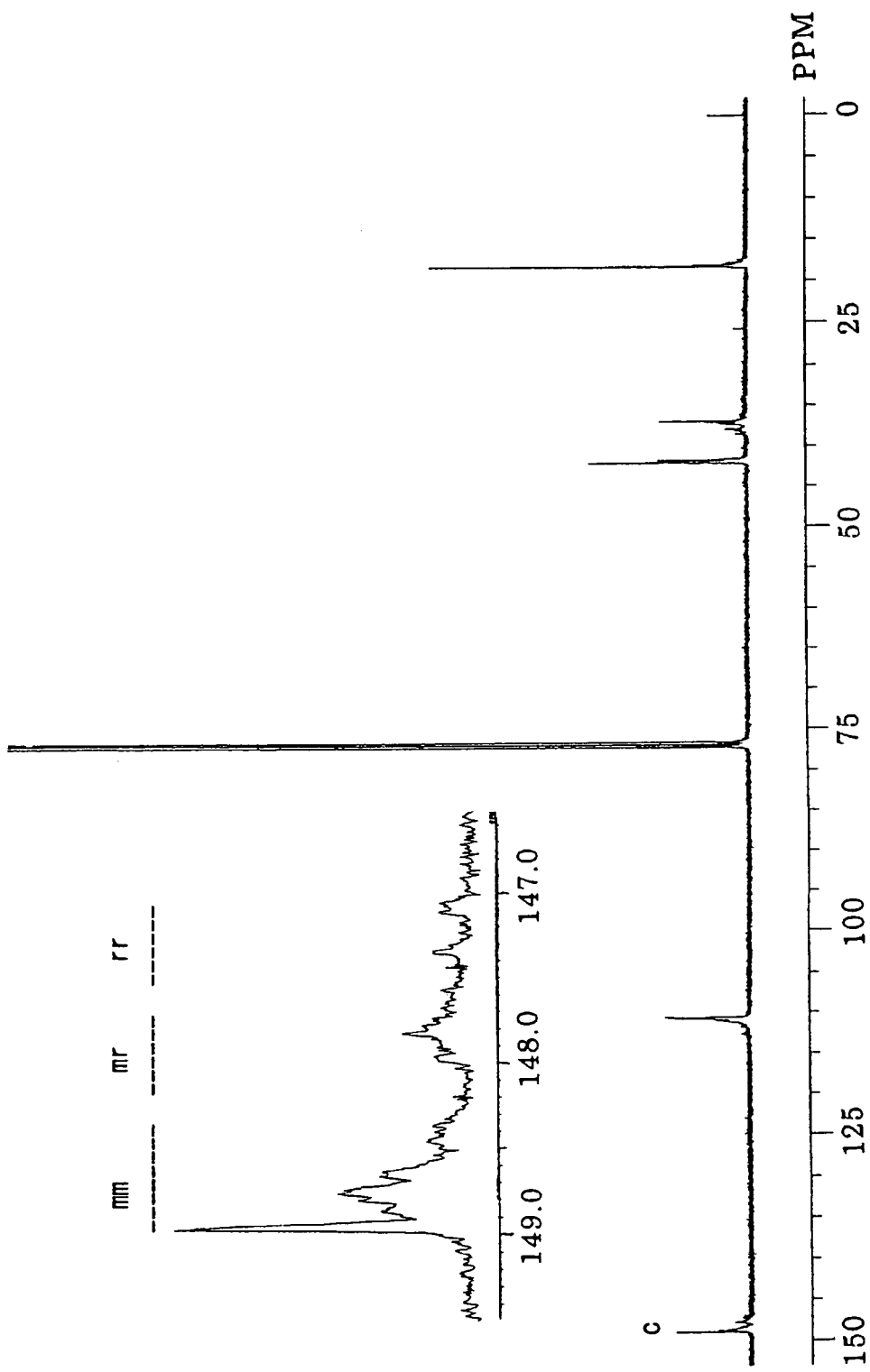
[FIG. 4] A measurement chart of a $^{13}$C-NMR spectrum of the polymer obtained in Example 4.

Meanwhile, the isotacticity of an arrangement of the structural units represented by Formula (I) (i.e., structural unit (I)) included in the isoprene-based polymer of the present invention may be determined by NMR spectrum data. For example, FIGS. 3 and 4 show measurement charts obtained by $^1$H-NMR and $^{13}$C-NMR for a polymer in which the rate of the structural units (I) in a microstructure is 99.3%, and the isotacticity of an arrangement of the structural units (I) is 80% mm. FIGS. 3 and 4 show peaks attributed to heterotactic triads (mr) and peaks attributed to syndiotactic triads (rr) as well as peaks attributed to isotactic triads (mm). On the other hand, FIGS. 1 and 2 show measurement charts obtained by $^1$H-NMR and $^{13}$C-NMR for a polymer in which the rate of the structural units (I) in a microstructure is 99.9%, and the isotacticity of an arrangement of the structural units (I) is >99% mmmm. FIGS. 1 and 2 reveals that the peaks attributed to heterotactic triads (mr) and peaks attributed to syndiotactic triads (rr), which are observed in FIGS. 3 and 4, are almost disappeared. Further, it is also found that the peaks attributed to isotactic triads (mm) are selectively attributed to isotactic pentads (mmmm). Therefore, the isotacticity of an arrangement of the structural units (I) included in the isoprene-based polymer of the present invention may be determined by comparing the integrated values of those peaks.

EXAMPLES

Hereinafter, the present invention will be described in more detail by way of examples, but the scope of the present invention is not limited to the following examples.

The polymerization reactions in Examples were performed in a glovebox (Mbraun glovebox) under an argon or nitrogen atmosphere. Argon was purified by passing through a Dryclean column (4A molecular sieves, Nikka Seiko Co.) and a Gasclean GC-XR column (Nikka Seiko Co.). The moisture and oxygen contents were consistently maintained to 1 ppm or less by $0_2/H_2O$ Combi-Analyzer (Mbraun). As an NMR tube, J Young valve NMR tube (Wilmad 528-Y) was used. The solvents used in Examples (hexane, THF, $Et_2O$, toluene, and benzene) were distilled from Na and benzophenone in an argon stream, followed by freeze-degassing with liquid nitrogen. The resultant products were identified by $^1$H-NMR, $^{13}$C-NMR (JNM-AL 400RN, manufactured by JEOL Ltd.), GPC (TOSOH HLC-8220), UV (SHIMADZU CORPORATION UV-PC SERIES UV-2400PC/UV-2500PC), and X-ray crystal structure analysis. The elemental analyses thereof were performed by Chemical Analysis Division of RIKEN. Note that, in Examples, the abbreviations Cy, Mw, Mn, and Mw/Mn represent cyclohexyl group, weight average molecular weight, number average molecular weight, and index of molecular weight distribution, respectively.

Example 1

A solution of $[Ph_3C][B(C_6F_5)_4]$ (0.023 mg, 0.025 mmol) in chlorobenzene (5 ml) was dropped to a solution of $[Me_2Si(C_5Me_4)(PCy)YCH_2SiMe_3]_2$ (0.024 mg, 0.025 mmol) and isoprene (1.022 g, 15 mmol, 600 eq.) in chlorobenzene (10 ml) with vigorous stirring at −20° C. in a nitrogen atmosphere. The mixture was allowed to react at −20° C. for 24 hours. Thereafter, methanol was added to terminate the polymerization, and the resultant mixture was added to a large amount of a methanol solution containing small amounts of hydrochloric acid and butylhydroxyltoluene (BHT). The precipitated polymer was separated by decantation and washed with methanol, followed by drying under reduced pressure at 50° C. for 24 hours.

Yield of the resultant polymer: 0.41 g (% yield: 40%) Selectivity of 3,4-additional structural unit: 99.9% Isotacticity: >99% mmmm Number average molecular weight: 7.4× $10^5$ Molecular weight distribution: 1.6

FIGS. 1 and 2 respectively show $^1$H-NMR spectrum and $^{13}$C-NMR spectrum charts of the copolymer obtained in Example 1.

Example 2

The same procedures as in Example 1 were repeated except that the reaction temperature and the reaction time in Example 1 were changed from −20° C. to −10° C. and from 24 hours to 16 hours, respectively, to thereby yield a polymer.

Yield of the resultant polymer: 0.61 g (% yield: 60%) Selectivity of 3,4-additional structural unit: 99.9% Isotacticity: 96% mm Number average molecular weight: 3.7×$10^5$ Molecular weight distribution: 1.6

Example 3

The same procedures as in Example 1 were repeated except that the reaction temperature and the reaction time in Example 1 were changed from −20° C. to 0° C. and from 24 hours to 16 hours, respectively, to thereby yield a polymer.

Yield of the resultant polymer: 0.77 g (% yield: 77%) Selectivity of 3,4-additional structural unit: 99.7% Isotacticity: 96% mm Number average molecular weight: $5.7 \times 10^5$ Molecular weight distribution: 1.6

Example 4

The same procedures as in Example 1 were repeated except that the reaction temperature and the reaction time in Example 1 were changed from −20° C. to 25° C. and from 24 hours to 2 hours, respectively, to thereby yield a polymer.

Yield of the resultant polymer: 1.02 g (% yield: 100%) Selectivity of 3,4-additional structural unit: 99.3% Isotacticity: 80% mm Number average molecular weight: $1.6 \times 10^5$ Molecular weight distribution: 1.7

FIGS. 3 and 4 respectively show $^1$H-NMR spectrum and $^{13}$C-NMR spectrum charts of the copolymer obtained in Example 4.

Example 5

The same procedures as in Example 1 were repeated except that the reaction temperature, the reaction time, and the amount of isoprene in Example 1 were changed from −20° C. to 25° C., from 24 hours to 2 hours, from 1.022 g to 2.044 g, respectively, to thereby yield a polymer.

Yield of the resultant polymer: 2.04 g (% yield: 100%) Selectivity of 3,4-additional structural unit: 99.3% Isotacticity: 80% mm Number average molecular weight: $3.0 \times 10^5$ Molecular weight distribution: 1.8

Example 6

The same procedures as in Example 1 were repeated except that the reaction temperature, the reaction time, and the amount of isoprene in Example 1 were changed from −20° C. to 25° C., from 24 hours to 2 hours, from 1.022 g to 4.088 g, respectively, to thereby yield a polymer.

Yield of the resultant polymer: 3.00 g (% yield: 75%) Selectivity of 3,4-additional structural unit: 99.3% Isotacticity: 80% mm Number average molecular weight: $5.0 \times 10^5$ Molecular weight distribution: 1.8

Example 7

A solution of isoprene (0.511 g, 7.5 mmol, 300 eq.) in chlorobenzene (5 ml) was dropped to a solution of [Me$_2$Si (C$_5$Me$_4$) (PCy)YCH$_2$SiMe$_3$]$_2$ (0.024 mg, 0.025 mmol) and [Ph$_3$C] [B(C$_6$F$_5$)$_4$] (0.023 mg, 0.025 mmol) inchlorobenzene (10 ml) with vigorous stirring at −20° C. in a nitrogen atmosphere. The mixture was allowed to react at −20° C. for 16 hours. Thereafter, methanol was added to terminate the polymerization, and the resultant mixture was added to a large amount of a methanol solution containing small amounts of hydrochloric acid and butylhydroxyltoluene (BHT). The precipitated polymer was separated by decantation and washed with methanol, followed by drying under reduced pressure at 50° C. for 24 hours.

Yield of the resultant polymer: 0.169 g (% yield: 33%) Selectivity of 3,4-additional structural unit: 99.9% Isotacticity: 99% mmmm The following three peaks were observed by GPC. Number average molecular weight: $1.9 \times 10^6$ (molecular weight distribution: 1.3), $2.3 \times 10^5$ (molecular weight distribution: 1.5), $1.3 \times 10^4$ (molecular weight distribution: 1.3)

Example 8

A solution of [Ph$_3$C] [B(C$_6$F$_5$)$_4$] (0.023 mg, 0.025 mmol) in chlorobenzene (5 ml) was dropped to a solution of [Me$_2$Si (C$_5$Me$_4$) (PCy)YCH$_2$SiMe$_3$]$_2$ (0.024 mg, 0.025 mmol) and myrcene (2.044 g, 15.0 mmol, 600 eq.) in chlorobenzene (10 ml) with vigorous stirring at room temperature in a nitrogen atmosphere. The mixture was allowed to react at room temperature for 3 hours. Thereafter, methanol was added to terminate the polymerization, and the resultant mixture was added to a large amount of a methanol solution containing small amounts of hydrochloric acid and butylhydroxyltoluene (BHT). The precipitated polymer was separated by decantation and washed with methanol, followed by drying under reduced pressure at 50° C. for 24 hours.

Yield of the resultant polymer: 1.980 g (% yield: 97%) Selectivity of 3,4-additional structural unit: 100% Isotacticity: 99% mm Number average molecular weight: $8.0 \times 10^5$ Molecular weight distribution: 1.7

INDUSTRIAL APPLICABILITY

The isoprene-based polymer of the present invention has high isotacticity and is considered to have excellent properties in mechanical or thermal durability. Therefore, the polymer is expected to be used as a plastic material. Further, the polymer of the present invention has a 1-alkylvinyl or 1-alkenylvinyl group containing a carbon-carbon double bond as a side chain, so that chemical modification of the double bond leads to development of a novel functional polymer.

The invention claimed is:

1. An isoprene-based polymer including a structural unit represented by Formula (I):

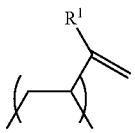

wherein $R^1$ represents an alkyl group having 1 to 10 carbon atoms or an alkenyl group having 3 to 10 carbon atoms, wherein the isotacticity of an arrangement of the structural units is 60% mm or more in terms of triad content.

2. The polymer according to claim 1, wherein $R^1$ in Formula (I) is a methyl group.

3. The polymer according to claim 1, wherein the isotacticity is 99% mmmm or more in terms of pentad content.

4. The isoprene-based polymer according to claim 1, wherein the rate of the structural units represented by Formula (I) in a microstructure is 95% or more.

5. The polymer according to claim 1, wherein the polymer has a number average molecular weight of 5,000 to 6,000,000.

6. A production method for the isoprene-based polymer according to any one of claims 1 to 5, which comprises;

polymerizing an isoprene-based compound represented by the following Formula (X):

wherein $R^2$ represents an alkyl group having 1 to 10 carbon atoms or an alkenyl group having 3 to 10 carbon atoms, in the presence of a polymerization catalyst containing a complex represented by the following Formula (A):

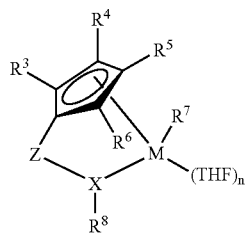

wherein M represents a rare-earth metal atom, each of $R^3$ to $R^6$ independently represents a hydrogen atom or an alkyl group, $R^7$ represents an alkyl group, $R^8$ represents an aryl or alkyl group, THF represents a tetrahydrofuran ligand, n denotes an integer of 0 to 2, X represents N, P, or As, and Z represents a dialkylsilylene, dialkyl germanium cross-linking, or an ethylene group.

7. The production method according to claim 6, wherein $R^2$ in Formula (X) is a methyl group.

8. The production method according to claim 6, wherein the polymerization is solution polymerization, and the polymerization reaction temperature is 0° C. or lower.

* * * * *